Aug. 9, 1949.    H. D. FOSTER    2,478,757
PROCESS OF PRODUCING LIGHT WEIGHT AGGREGATES
Filed July 8, 1944
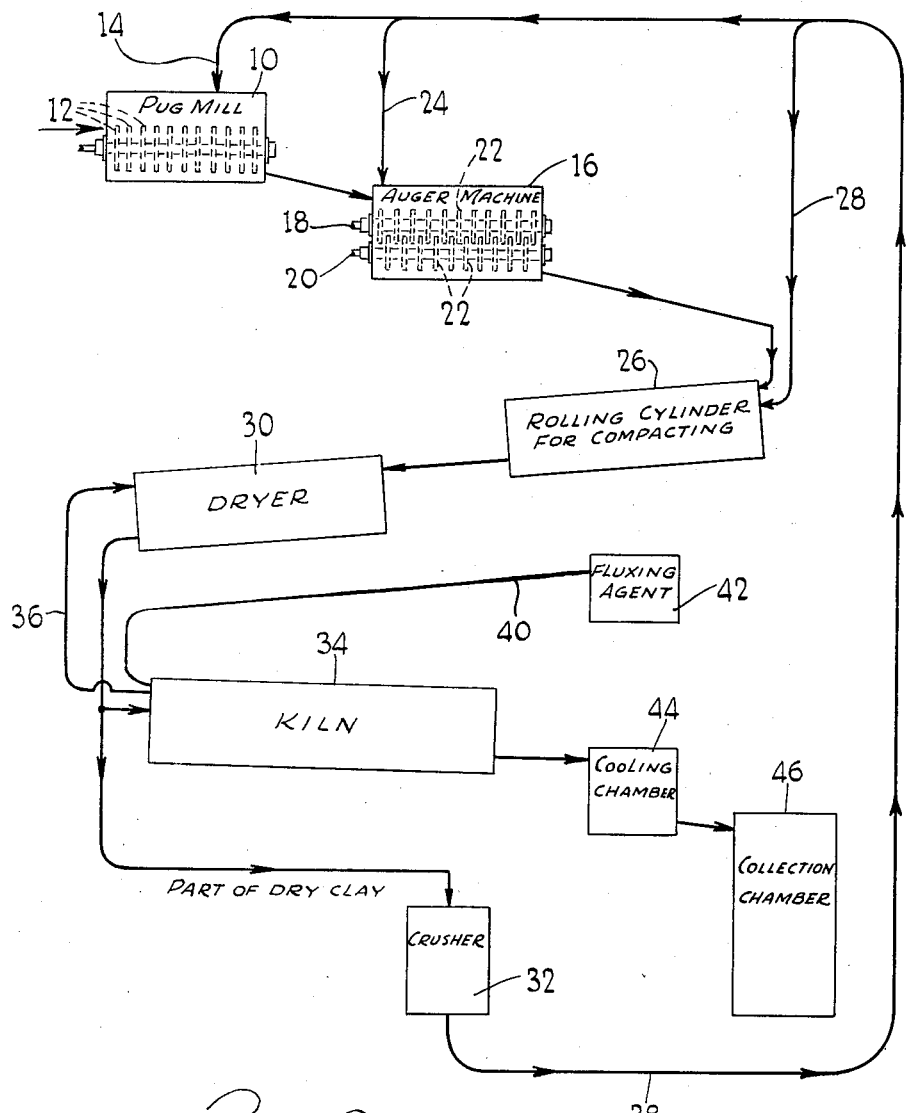
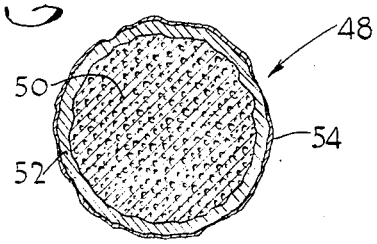
INVENTOR.
HARRY D. FOSTER
ATTORNEYS Patented Aug. 9, 1949

2,478,757

UNITED STATES PATENT OFFICE 2,478,757

PROCESS OF PRODUCING LIGHTWEIGHT AGGREGATES

Harry D. Foster, Washington, D. C., assignor to North American Cement Corporation, Catskill, N. Y., a corporation of Delaware Application July 8, 1944, Serial No. 544,084

6 Claims. (Cl. 25—156)

This invention relates to a method of production of light weight aggregates.

It is known that concrete compositions made with sand, gravel and cement are very valuable structural materials because of their great strength, cheapness, resistance to fire and ready conformity to desired shapes. However, all such structural materials have the inherent objection of being very dense and heavy. They are difficult to handle except in units cast in situ in small units such as the usual concrete block, and they tend to crack when subjected to fire. Many attempts have been made to provide the building industry with light weight aggregates in order that structural concretes can be made which will possess the advantages of concrete made with sand or gravel without the great disadvantage of high density, weight or specific gravity.

Various byproducts, such as, slags, cinders, sawdust and the like, have been suggested as light weight aggregates for use in cement compositions, building blocks and the like. Such materials usually have one or more defects such as lack of uniformity, variable strength, excessive costs, small savings in weight and lack of availability at the point or place of desired use.

Attempts have been made, also, to use naturally occurring porous or expanded materials, including pumice or other volcanic materials, diatomaceous earth and similar substances. For the most part, these natural materials have proven uneconomic except for use near where they are found in nature.

Probably the greatest activity in providing light weight aggregates has been in the field of expanded or bloated natural products. For example, shale has been expanded by rapid firing in a rotary kiln in coarse lumps and later crushed to produce aggregates of desired sizes. Another method involves extruding clay or the like through perforated dies and cutting the extruded material into desired lengths. The particles are then dried, coated with a refractory material, and fired at the partial fusion temperature of the clay to expand the particles. This method of forming lightweight aggregates has several disadvantages involving relatively high power costs for extruding the clays, difficulty of preventing agglomeration of the damp extruded particles, and provides only particles of relatively uniform size which are undesirable for certain structural purposes.

It is a major purpose of this invention to produce light weight aggregates, especially adapted for use in concrete structures, by a simple and economic process from readily available and inexpensive naturally occurring raw materials.

It is a special object of the invention to produce light weight aggregates from naturally occurring raw materials which are found widely distributed in nature without expensive pretreatment of the raw materials or after treatment of said formed aggregates.

Another object of the invention is to provide a special process for expanding natural raw materials which aids in the formation of pores and vesicles whereby particles of the desired degree of porosity are obtained.

Other objects, purposes and features of my invention will be apparent from the more detailed description which follows.

In a preferred practice of my invention, plastic crude clays, shales or similar argillaceous or ceramic materials such as are used in the manufacture of bricks or the like, are used in a wet condition just as they come from the pit. If large stones or other deleterious ingredients are present they are removed by customary methods and the wet or moist material is fed to an ordinary milling machine such as the type commonly used in the brick industry. After the material is thoroughly mixed in the milling machine a powdered segregating agent is introduced and the milling or kneading is continued until small particles or pellets of varying sizes are formed. The continuity of the process is facilitated, and the uniformity and generally the strength of the ultimate product is improved if the segregating agent consists of dried and powdered material of the same composition as that obtained in the process itself. As the particles leave the milling machine, they are preferably further dusted with the same segregating agent to prevent agglomeration although other powdered materials such as various dried clays, powdered limestone, lime, hydrated lime, Portland cement and cement kiln flue dust may be used as segregating agent. It is also advantageous to round the particles or pellets by running them through an inclined rotary cylinder or over an inclined vibrating table. Thereafter, the particles are dried and part are advantageously powdered for use as a segregating agent.

The remaining dried particles and a fluxing agent, having a fusion point above that at which it fuses with the pellets and preferably above that of the formed pellets, are introduced into a suitable heating chamber such as the customary inclined rotary kiln. As the pellets pass through the kiln in contact with the fluxing agent they gradually become plastic or fused and acquire a coating of the fluxing agent. This coating forms an outer unfused surface which prevents agglomeration of the particles and an intermediate fluxed or fluid yet expansible wall around each particle of the aggregate, tending to entrap evolved gases and aid in the bloating of the particles. Heating is continued until the interior of the particles is fired and at least partially fused and the evolved gases cause expanded pellets to form having a multiplicity of closed pores encompassed within a shell composed of a glossy or vitrified water tight inner layer and rough textured outer layer, especially adapted for bonding to cement in concrete.

For most argillaceous or ceramic materials, the firing period should be rapid, five to fifteen minutes usually sufficing. After firing, the expanded material should be rapidly cooled to produce an annealing effect which improves the ultimate strength of the pellets. The firing temperatures and the period of firing will depend upon the raw material used and the type of pellets desired. For ordinary clays, temperatures of about 1600° F. to 2200° F. have been found satisfactory. In this way, bloated pellets of ceramic material having a weight of about 10 to 60 pounds per cubic foot are obtained although particles having weights without this range may be formed.

In a special embodiment of my invention I have found it advantageous to use two milling machines although good results can be procured with a single machine. In operating with two milling machines the argillaceous material is first introduced into a pugmill provided with the customary knives. As the materials pass through this machine, they are thoroughly mixed to a relatively uniform consistency and may be partially pelletized preferably with the aid of a segregating agent added near its exit. From the first machine the argillaceous materials are introduced in a shallow layer into a second milling machine advantageously provided with spirally arranged pins attached to shafts in such a manner that the pins intermesh and exert a shearing action as the shafts revolve. The use of dual milling machines has been found to permit a more accurate control of the size of the particles obtained.

Various fluxing agents having a melting point above that at which they fuse with the argillaceous materials being expanded, and preferably those having a melting point above that of the argillaceous materials themselves, may be used in my process. Lime and other materials high in lime content due to their cheapness, ready availability, and relatively non-plastic nature have proven particularly advantageous. Other alkaline earth compounds, such as magnesium, barium, and strontium oxides and carbonates, and various other magnesium, strontium, barium salts and similar compounds may be used. In some instances, argillaceous materials themselves may be used as a fluxing agent.

My process and the nature of the light weight aggregates produced thereby will be readily understood from the attached drawings, in which Figure 1 is a flow chart of my process, and Figure 2 is a diagrammatic sectional representation of one of the light weight pellets produced. As shown in the drawings, the argillaceous material first enters a pug mill 10 provided with shearing knives 12 and a tube 14 for the introduction of the segregating agent. From the first pug mill 10 the thoroughly mixed and partially pelletized material is conveyed in a thin layer to a second mill 16 provided with rotatable shafts 18 and 20 having intermeshing pins 22, wherein the pelletizing is completed. An additional amount of segregating agent for completing the pelletizing is introduced into the second mill 16 through tube 24. As the pellets are conveyed from the mill 16 to the compacting chamber 26, the pellets are further dusted with a powder introduced through a tube 28. From the compacting chamber 26 the pellets are conveyed to their drier 30 and thence partially to the crusher 32 and partially to the kiln 34. Kiln 34 and drier 30 are advantageously connected through a gas conveyor 36 in order that the flue gases may be used to dry the pellets. The argillaceous material powdered in crusher 32 is led through pipe 38 back to the points 14, 24 and 28 where the dry powdered material is introduced into the milling machines and compacting cylinder to assist in segregating and forming the aggregate into small particles of various sizes. As the pellets are introduced into the kiln 34 fluxing agents are introduced into the kiln through tube 40 from a source of supply 42. The bloated or expanded pellets pass from the kiln 34 into rapid cooling unit 44 and thence to collection chamber 46. From the foregoing chart, it is readily seen that the process is simple and continuous.

In Figure 2 the nature of the pellets produced in accordance with the present process is also diagrammatically represented by a sectional view. The pellet 48, which may be of spherical, oval or of somewhat irregular shape, is composed of a cellular inner mass of clay expanded by heat and generally designated at 50. This cellular inner mass 50 is surrounded by a shell composed of a substantially solid and water impervious peripheral interface 52 formed between the bloated inner mass and a rought textured unfused outer layer 54 formed by the fluxing agent. The closed pores of the pellets 48 and the substantially water impervious inner layer 52 of the shell prevent excessive absorption of water when the pellets are used as light weight aggregates in the making of concrete. This produces an initial lightness of weight even before the excess water used in making the mix has evaporated. The rough textured and irregular outer surface 54 formed by the limestone or other fluxing agent facilitates and improves the adherance or bonding of the cement to the aggregate.

In the operation of the process the breaking up and separation of the clay or other material into particles in the mills 10 and 16 is facilitated by the introduction of the dry powdered separating material at the points 14 and 24, and a further coating of the particles is brought about by the introduction of a dry powder at 28. The dry powder used may be produced from the previously dried and ground ceramic material used to form the expanded body of the particles or other dry powdered material may be used at any one or all of the points 14, 24 and 28. This dry coating fuses at approximately the same temperature as the body of the particles and as the coating is dry it does not expand in the same manner as the moist interior of the particles but forms with the fluxing agent an elastic fused film during the firing and expansion of the particles which helps keep the gases inside the vitreous envelope 52 formed by the mixture of the dry powder and the fluxing agent on the particles 50.

The moisture and other naturally occurring ingredients in the ceramic material are sufficient in most instances to produce the desired degree of expansion and it is not necessary to introduce carbonaceous or other gas forming ingredients into the ceramic material.

The fluxing agent preferably is not fused on its outer surface in the firing kiln but forms a dry roughened and textured exterior around the vitreous envelope which is rough enough to promote adherence to the cement or plaster in which the aggregates are used. It is preferable to use aggregates of the type produced in this process of various dimensions without crushing them.

Such light weight aggregates may be used in the manufacture of light weight concrete blocks, cast concrete objects, wall tile, acoustical plasters, poured concrete and the like. They may be readily made at any point where clay or shale is found.

The foregoing description constituting illustrative embodiments of this invention is not to be considered a limitation upon the invention, for the invention contemplates various adaptations, alterations and modifications expected of those skilled in the art, limited only by the scope of the appended claims.

I claim:

1. A process for producing light weight aggregates from a wet heat-expansible naturally occurring heterogeneous mass of plastic clay comprising dividing said clay into small pieces by working said clay in its natural state in the presence of a segregating agent consisting of said clay in a powdered and dry state, coating said pieces with a fluxing agent having a fusing point above that of the clay, and heating said pieces to form light weight bloated pebble-like particles.

2. A process for producing light weight cellular aggregates comprising milling a moist heat-expansible naturally occurring heterogeneous plastic ceramic clay in the presence of a segregating agent consisting of said clay in a powdered and dry state, further coating said pieces with a fluxing agent having a fusing point above that of said clay, and heating said coated pieces to expand and vesiculate the ceramic material, thereby forming a light weight cellular aggregate having a shell with a fused inner surface and an irregular unfused outer surface.

3. A process for producing light weight aggregates from a heat-expansible wet crude mass of plastic clay comprising milling said clay in the raw state to form a relatively uniform mixture, further milling the mixture in a thin layer in the presence of a segregating agent consisting of said clay in a powdered and dry state to form granules of varying sizes, agitating the granules to shape them, coating the granules with a calcareous fluxing agent for the clay, heating the coated granules to at least partially fuse the clay and anneal the fused and coated granules, thereby forming light weight cellular granules of irregular size having a calcareous coat composed of a vitrified inner layer and an unfused irregularly textured outer layer.

4. A process for producing light weight aggregates from naturally occurring heat-expansible heterogeneous plastic clay comprising pelletizing said material by milling it in the presence of a dried and powdered clay obtained from a later phase of the process, drying said pellets, segregating and powdering part of said dried pellets for assisting in the pelletizing operation, heating the remaining dried pellets in the presence of a fluxing agent having a fusing point above that at which it fuses with the clay to form pellets coated with said fluxing agent, and firing said coated pellets to form a bloated cellular light weight aggregate having an outer surface composed of a vitrified inner layer and an outer layer of an irregular rough texture.

5. The process for producing light weight cellular aggregates from naturally occurring moist heat-expansible heterogeneous plastic clay comprising milling said clay in its natural state in a milling machine, introducing the milled clay into a second milling machine provided with irregular spaced fingers and further milling it therein, introducing powdered and dried clay obtained from a later phase of the process into the first-mentioned milling machine near its outlet and into the second milling machine to act as a segregating agent facilitating the forming of irregular pellets coated with the dried clay, agitating the irregular pellets to shape them, drying said coated pellets, segregating and powdering part of the dried pellets for introduction into the milling machines, heating the remaining dried pellets and coating them with an alkaline earth fluxing agent having a melting point above that of the clay, and continuing the heating of the pellets coated with alkaline earth compound to form light weight cellular aggregates having an irregular coating composed of a vitrified inner layer impeding the entrance of water into the aggregate and an irregular-textured outer layer.

6. A process for producing vesicular aggregates from heat-expansible naturally occurring plastic clay comprising working said clay in its natural state in the presence of a segregating agent consisting of said clay in a powdered and dry state to form relatively small pieces of varying size, drying said pieces, introducing said pieces and a calcareous material high in lime content into a heating zone, heating therein at temperatures of the order of 1600° to 2200° F. for a period of 5 to 15 minutes, quickly cooling the pieces to a temperature below the fusion temperature of said clay, and slowly cooling thereafter to form heterogeneous light weight bloated pebble-like masses having an outer surface composed of a glassy water-tight inner layer and a rough-textured unfused outer layer.

HARRY D. FOSTER.

REFERENCES CITED

The following references are of record in the file of this patent:

UNITED STATES PATENTS

| Number | Name | Date |
|---|---|---|
| 1,892,074 | Nielsen | Dec. 27, 1932 |
| 1,970,471 | Nichols | Aug. 14, 1934 |
| 2,003,850 | Alton | June 4, 1935 |
| 2,014,065 | Dean | Sept. 10, 1935 |
| 2,035,845 | Stanton | Mar. 31, 1936 |
| 2,112,380 | Price | Mar. 29, 1938 |
| 2,163,678 | Gundlach | June 27, 1939 |
| 2,199,046 | Evenstad | Apr. 30, 1940 |

FOREIGN PATENTS

| Number | Country | Date |
|---|---|---|
| 117,504 | Great Britain | July 25, 1918 |